Dec. 15, 1925.

L. B. GOUD

TRANSMISSION MECHANISM FOR VEHICLES

Filed Oct. 29, 1924

INVENTOR
Lyman B. Goud
BY
ATTORNEY

Patented Dec. 15, 1925.

1,565,271

UNITED STATES PATENT OFFICE.

LYMAN B. GOUD, OF BROOKLYN, NEW YORK.

TRANSMISSION MECHANISM FOR VEHICLES.

Application filed October 29, 1924. Serial No. 746,494.

*To all whom it may concern:*

Be it known that I, LYMAN B. GOUD, a citizen of the United States, residing at Brooklyn, in the county of Kings and State of New York, have invented certain new and useful Improvements in Transmission Mechanism for Vehicles, of which the following is a specification.

This invention relates to transmission mechanism for automobiles and motor vehicles generally, the invention having for an object the provision of a novel and simple transmission mechanism which is operated without any shifting of gears.

For further comprehension of the invention, and of the objects and advantages thereof, references will be had to the following description and accompanying drawing, and to the appended claims in which the various novel features of the invention are more particularly set forth.

Fig. 1 of the drawing is a side view showing my improved transmission mechanism.

Figure 1:
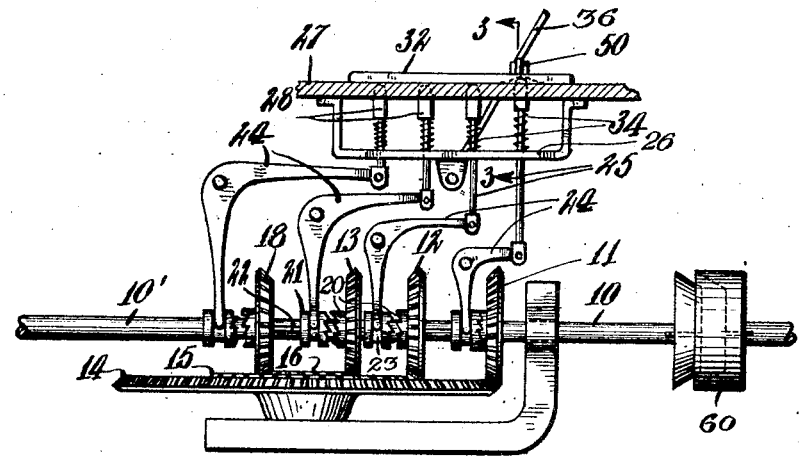
Figure 2:
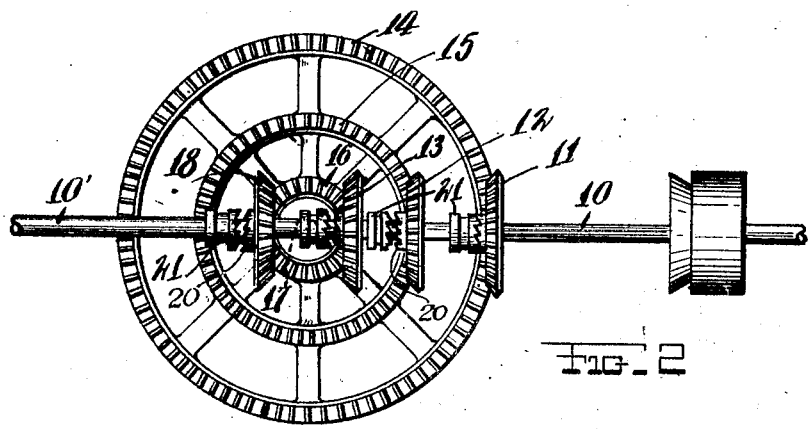
Fig. 2 is a plan view, the clutch operating parts being omitted.
Figures 3, 4:
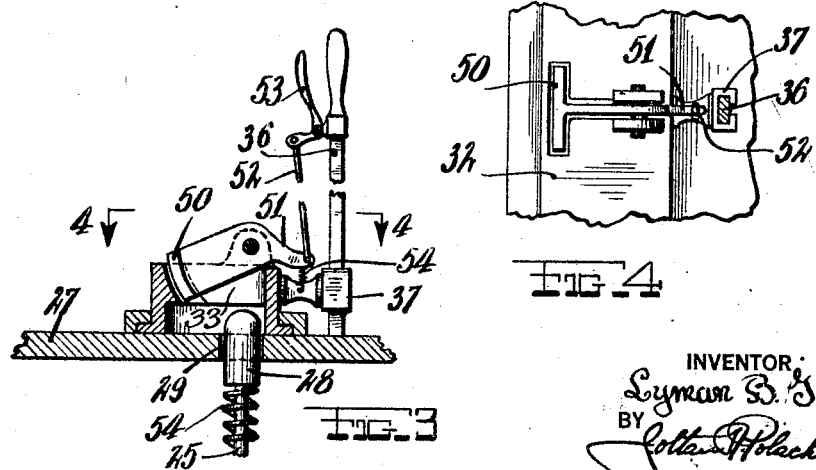
Fig. 3 is a detail transverse sectional view taken on the line 3—3 of Fig. 1.
Fig. 4 is a horizontal sectional view taken on the line 4—4 of Fig. 3.

In the drawing, the reference numeral 10 indicates a portion of the engine shaft of a motor vehicle, and 10' the transmission shaft to the rear axle, these two shafts being alined. Upon shaft 10 is fixed a bevel pinion 11, while shaft 10' has mounted thereon for free rotation a pair of bevel pinions 12 and 13. These pinions 11, 12 and 13 mesh with a series of bevel gears 14, 15 and 16 respectively fixed on a vertical shaft 17, the gear 14 being relatively large and the gears 15 and 16 of progressively decreasing diameter. A fourth pinion 18 is loosely mounted on the shaft 10' and meshes with the smaller gear 16 oppositely to the pinion 13. The bevel pinions are formed with one way clutch faces 20 that are adapted to be engaged by complementary clutch collars 21 mounted on the shaft 10' to slide therealong, and feathered to said shaft as indicated at 22. These clutch collars are formed with the usual circumferential grooves 23 that receive the forked ends of the bell crank levers 24. The other ends of these levers have attached thereto the lower ends of vertical plunger rods 25 that extend upward through a horizontal strap 26 mounted under a flooring or other frame element 27. These rods are formed on their upper ends with enlarged heads 28 having rounded tops, these heads being accommodated in apertures such as 29 in the said element 27. Slidably mounted on the said element 27 is an elongated plate 32 that has a beveled recess 33 in the underside thereof into which the upper ends of the rod heads 28 are adapted to be projected by expansion springs 34 that bear upward on said heads, when the said recess is brought into registry with either of said heads. Movement of the rods 25 upward when their heads engage in said recess throws the clutch collars 21 to operative position, the plate 32 acting as a stop to retain the said clutch collars normally inoperative. The plate 32 is moved by means of a hand lever 36 fulcrumed as desired to the frame of the vehicle and passing through a slotted box 37 pivotally mounted on the side of the plate.

In the operation of my improved transmission, when the right hand clutch element on shaft 10' is engaged with the gear pinion 11 the shaft 10' is driven in unison with the shaft 10. By shifting the plate 32 forward this clutch is disengaged, and the clutch of pinion 12 brought into operation, this being the medium speed position. Likewise the low speed and reverse are brought into action by a further shifting of the plate. When the main clutch of the engine shaft, indicated at 60, is thrown out all the gears slow down or stop, the desired one-way clutch is thrown in, and due to the movement of the car this clutch slips until the engine clutch is thrown in and the engine accelerated. By providing suitable oil or grease in the transmission case the slipping is rendered noiseless. A further advantage lies in the fact that in coasting down hill the engine idles without the need of touching the main clutch or the shifting lever.

In order to enable the plate to be shifted from its high speed position backward, without allowing the rods 25 to spring upward as the recess 33 in the plate comes into registry therewith I may hinge in the plate a T-shaped arm 50 that has a tailpiece 51 to which is connected a flexible wire 52 that leads upward beside the lever 36 and is attached at its upper end to a grip member 52 mounted on the upper end of the lever. By pressing on this grip member the arm may be swung to a position preventing upward movement of the rod heads into the recess 33, a spring 54 returning the said arm to the normal raised position shown when the said member is released.

Having thus described my invention, what I claim as new and desire to protect by Letters Patent of the United States is as follows:—

1. A transmission mechanism comprising a drive shaft, a driven shaft alined with said drive shaft, a bevel pinion fixed on said drive shaft, a series of bevel pinions loose on said driven shaft and formed with one-way clutch faces, a series of co-axially fixed bevel gears of different diameters engaged by the respective bevel pinions, a series of clutch collars feathered on said driven shaft to engage the respective clutch faces, levers operatively engaged with said collars, plunger rods connected to said levers, and a slidable plate for selectively moving said plunger rods.

2. A transmission mechanism comprising a drive shaft, a driven shaft alined with said drive shaft, a bevel pinion fixed on said drive shaft, a series of bevel pinions loose on said driven shaft and formed with one-way clutch faces, a series of co-axially fixed bevel gears of different diameters engaged by the respective bevel pinions, a series of clutch collars feathered on said driven shaft to engage the respective clutch faces, levers operatively engaged with said collars, plunger rods connected to said levers, and a slidable plate for selectively moving said plunger rods, springs engaged with said plunger rods and acting to urge the said clutch collars to operative position, said plate acting as a stop to retain the said clutch collars in inoperative position, and having a recess in the bottom thereof adapted to selectively receive the upper ends of said rods to permit of movement of said clutch collars to operative position.

3. A transmission mechanism comprising a drive shaft, a driven shaft alined with said drive shaft, a bevel pinion fixed on said drive shaft, a series of bevel pinions loose on said driven shaft and formed with one-way clutch faces, a series of co-axially fixed bevel gears of different diameters engaged by the respective bevel pinions, a series of clutch collars feathered on said driven shaft to engage the respective clutch faces, levers operatively engaged with said collars, plunger rods connected to said levers, and a slidable plate for selectively moving said plunger rods, springs engaged with said plunger rods and acting to urge the said clutch collars to operative position, said plate acting as a stop to retain the said clutch collars in inoperative position, and having a recess in the bottom thereof adapted to selectively receive the upper ends of said rods to permit of movement of the said clutch collars to operative position, and a movable device carried by said plate and arranged for manual operation to close the said recess against entrance of the said upper ends of the rods.

4. A transmission mechanism comprising a drive shaft, a driven shaft alined with said drive shaft, a bevel pinion fixed on said drive shaft, a series of bevel pinions loose on said driven shaft and formed with one-way clutch faces, a series of co-axially fixed bevel gears of different diameters engaged by the respective bevel pinions, a series of clutch collars feathered on said driven shaft to engage the respective clutch faces, levers operatively engaged with said collars, plunger rods connected to said levers, and a slidable plate for selectively moving said plunger rods, springs engaged with said plunger rods and acting to urge the said clutch collars to operative position, said plate acting as a stop to retain the said clutch collars in inoperative position, and having a recess in the bottom thereof adapted to selectively receive the upper ends of said rods to permit of movement of the said clutch collars to operative position and a movable device carried by said plate and arranged for manual operation to close the said recess against entrance of the said upper ends of the rods, said device comprising a T-arm hinged at its end to the said plate to be swung into the said recess and extend across the bottom of the latter.

In testimony whereof I have affixed my signature.

LYMAN B. GOUD.